United States Patent
Shibasaki

(10) Patent No.: US 12,254,656 B2
(45) Date of Patent: Mar. 18, 2025

(54) APPARATUS, METHOD, AND STORAGE MEDIUM FOR ACQUIRING A REFLECTION CHARACISTIC OF AN OBJECT

(71) Applicant: CANON KABUSHIKI KAISHA, Tokyo (JP)

(72) Inventor: Akira Shibasaki, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 651 days.

(21) Appl. No.: 17/388,635

(22) Filed: Jul. 29, 2021

(65) Prior Publication Data

US 2022/0038614 A1  Feb. 3, 2022

(30) Foreign Application Priority Data

Aug. 3, 2020 (JP) ................. 2020-131687

(51) Int. Cl.
| | | |
|---|---|---|
| *G06V 10/141* | (2022.01) | |
| *G01J 1/02* | (2006.01) | |
| *G01J 1/06* | (2006.01) | |
| *G01N 21/47* | (2006.01) | |
| *G01N 21/55* | (2014.01) | |
| *G01N 21/57* | (2006.01) | |
| *G06V 10/60* | (2022.01) | |

(52) U.S. Cl.
CPC .......... *G06V 10/141* (2022.01); *G01J 1/0242* (2013.01); *G01J 1/06* (2013.01); *G01N 21/4738* (2013.01); *G01N 21/55* (2013.01); *G01N 21/57* (2013.01); *G06V 10/60* (2022.01)

(58) Field of Classification Search
CPC ...... G01N 21/25; G01N 21/255; G01N 21/47; G01N 21/4738; G01N 21/55; G01N 21/57; G01N 2021/575; G01J 1/0242; G01J 1/06; G01J 1/08; H04N 23/56; H04N 23/74; G06V 10/60; G06V 10/10; G06V 10/12; G06V 10/14; G06V 10/141; G06V 10/143; G06V 10/145

See application file for complete search history.

(56) References Cited

U.S. PATENT DOCUMENTS 6,788,413 B2 * 9/2004 Torfs ................ G01J 3/504
356/402
6,987,568 B2 * 1/2006 Dana ................. G01N 21/55
356/600

(Continued)

FOREIGN PATENT DOCUMENTS

CN 107645625 A * 1/2018 ........... G02B 21/06
JP 200721971 A 8/2007

(Continued)

*Primary Examiner* — Gordon J Stock, Jr.
(74) *Attorney, Agent, or Firm* — Canon U.S.A., Inc. IP Division

(57) ABSTRACT

An apparatus includes a control unit configured to control an illumination unit such that two or more light sources from among the plurality of light sources of the illumination unit are turned on when an image of an object is captured, and a derivation unit configured to derive a reflection characteristic of the object based on image data obtained by capturing the image of the object, wherein the control unit turns on the two or more light sources such that a distance between the two or more light sources is greater than a predetermined threshold value.

18 Claims, 11 Drawing Sheets

(56) References Cited

U.S. PATENT DOCUMENTS

| | | | | |
|---|---|---|---|---|
| 7,852,564 B2* | 12/2010 | Messina | ............ | G02B 19/0066 |
| | | | | 362/346 |
| 7,940,396 B2* | 5/2011 | Nisper | .................... | G01J 3/504 |
| | | | | 356/402 |
| 9,222,882 B2* | 12/2015 | Hirabayashi | .......... | G06T 15/506 |
| 9,989,463 B2* | 6/2018 | Skaff | .................... | G01N 21/255 |
| 10,097,736 B2* | 10/2018 | Ishii | ......................... | G06T 5/50 |
| 10,451,547 B2* | 10/2019 | Ser | ....................... | G01N 21/474 |
| 11,037,279 B2* | 6/2021 | Kitajima | .................. | G06T 5/70 |
| 11,061,243 B2* | 7/2021 | Anazawa | ................ | G02B 5/28 |
| 11,531,220 B2* | 12/2022 | Song | .................... | G06T 7/0004 |
| 11,659,283 B2* | 5/2023 | Jinno | .................... | H04N 23/74 |
| | | | | 348/370 |
| 11,729,512 B2* | 8/2023 | Kudo | .................... | G03B 15/02 |
| | | | | 348/370 |
| 11,846,583 B2* | 12/2023 | Ojima | .................. | G01N 21/255 |
| 2004/0141175 A1* | 7/2004 | Baldwin | ............ | G01N 21/8806 |
| | | | | 356/237.2 |
| 2014/0217901 A1* | 8/2014 | Logiudice | .............. | H05B 45/12 |
| | | | | 315/297 |
| 2015/0012226 A1* | 1/2015 | Skaff | ....................... | G01N 21/55 |
| | | | | 702/22 |
| 2020/0375466 A1* | 12/2020 | Ras | ....................... | A61B 5/0077 |
| 2021/0200064 A1* | 7/2021 | Van Der Sijde | ....... | G03B 15/03 |

FOREIGN PATENT DOCUMENTS

| | | | | | |
|---|---|---|---|---|---|
| TW | I407093 B | * | 9/2013 | | |
| WO | WO-9301559 A1 | * | 1/1993 | ............... | G06K 9/00 |
| WO | WO-2018037604 A1 | * | 3/2018 | ............. | G01B 11/02 |
| WO | WO-2021215752 A1 | * | 10/2021 | ............. | G01S 17/42 |

* cited by examiner

FIG.6

| IMAGE CAPTURING ORDER | LIGHTING GROUP 1 (a1, b1) | LIGHTING GROUP 2 (a2, b2) | LIGHTING GROUP 3 (a3, b3) | LIGHTING GROUP 4 (a4, b4) | LIGHTING GROUP 5 (a5, b5) | LIGHTING GROUP 6 (a6, b6) |
|---|---|---|---|---|---|---|
| 1 | (1, 1) | (1, 7) | (1, 13) | (10, 1) | (10, 7) | (10, 13) |
| 2 | (1, 2) | (1, 8) | (1, 14) | (10, 2) | (10, 8) | (10, 14) |
| 3 | (1, 3) | (1, 9) | (1, 15) | (10, 3) | (10, 9) | (10, 15) |
| 4 | (1, 4) | (1, 10) | (1, 16) | (10, 4) | (10, 10) | (10, 16) |
| 5 | (1, 5) | (1, 11) | (1, 17) | (10, 5) | (10, 11) | (10, 17) |
| ... | ... | ... | ... | ... | ... | ... |
| 54 | (9, 6) | (9, 12) | (9, 18) | (18, 6) | (18, 12) | (18, 18) |

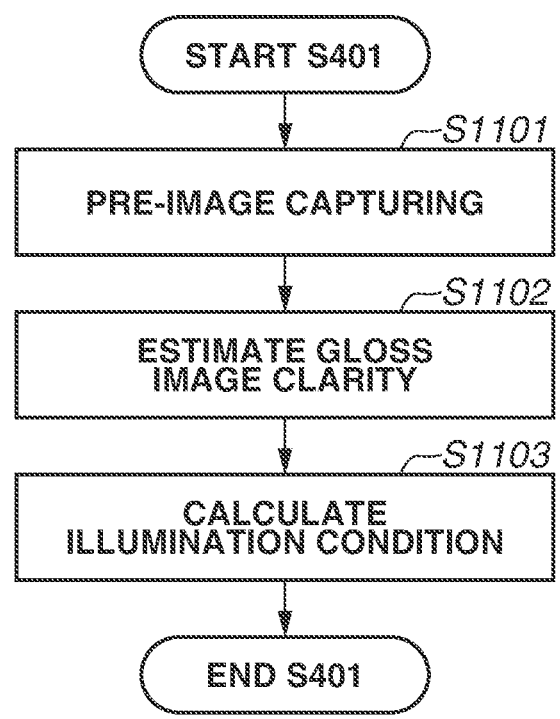

APPARATUS, METHOD, AND STORAGE MEDIUM FOR ACQUIRING A REFLECTION CHARACISTIC OF AN OBJECT

BACKGROUND OF THE DISCLOSURE

Field of the Disclosure

The aspect of the embodiments relates to a technology for acquiring a reflection characteristic of an object.

Description of the Related Art

In recent years, measurement data of the bidirectional reflectance distribution function (BRDF) representing a reflection characteristic, which changes depending on an illumination direction or an observation direction, has been used to evaluate the material appearance of an object. Also, measurement data of the spatially-varying bidirectional reflectance distribution function (SVBRDF) representing the two-dimensional distribution of a reflection characteristic has been used. Japanese Patent Application Laid-Open No. 2007-219715 discusses the technique for irradiating an object with illumination light from a plurality of directions, capturing an image of the object with a camera from a plurality of directions, and creating reflection characteristic data on the object based on a plurality of obtained images.

Unfortunately, Japanese Patent Application Laid-Open No. 2007-219715 has an issue that image capturing is time-consuming since image capturing is executed in each incident direction of light.

SUMMARY OF THE DISCLOSURE

According to an aspect of the embodiments, an apparatus includes a control unit configured to control an illumination unit such that two or more light sources from among the plurality of light sources of the illumination unit are turned on when an image of an object is captured, and a derivation unit configured to derive a reflection characteristic of the object based on image data obtained by capturing the image of the object, wherein the control unit turns on the two or more light sources such that a distance between the two or more light sources is greater than a predetermined threshold value.

Further features of the disclosure will become apparent from the following description of exemplary embodiments with reference to the attached drawings.

BRIEF DESCRIPTION OF THE DRAWINGS

FIG. 6 is a table illustrating an example of a calculated illumination condition.

FIG. 11 is a flowchart illustrating a process to calculate an illumination condition.

DESCRIPTION OF THE EMBODIMENTS

Exemplary embodiments will be described below with reference to the drawings. The following exemplary embodiments do not necessarily limit the disclosure. All the combinations of features described in the exemplary embodiments are not necessarily essential to the solving means according to the disclosure.

<Configuration of Reflection Characteristic Acquisition System>

Figure 1A:
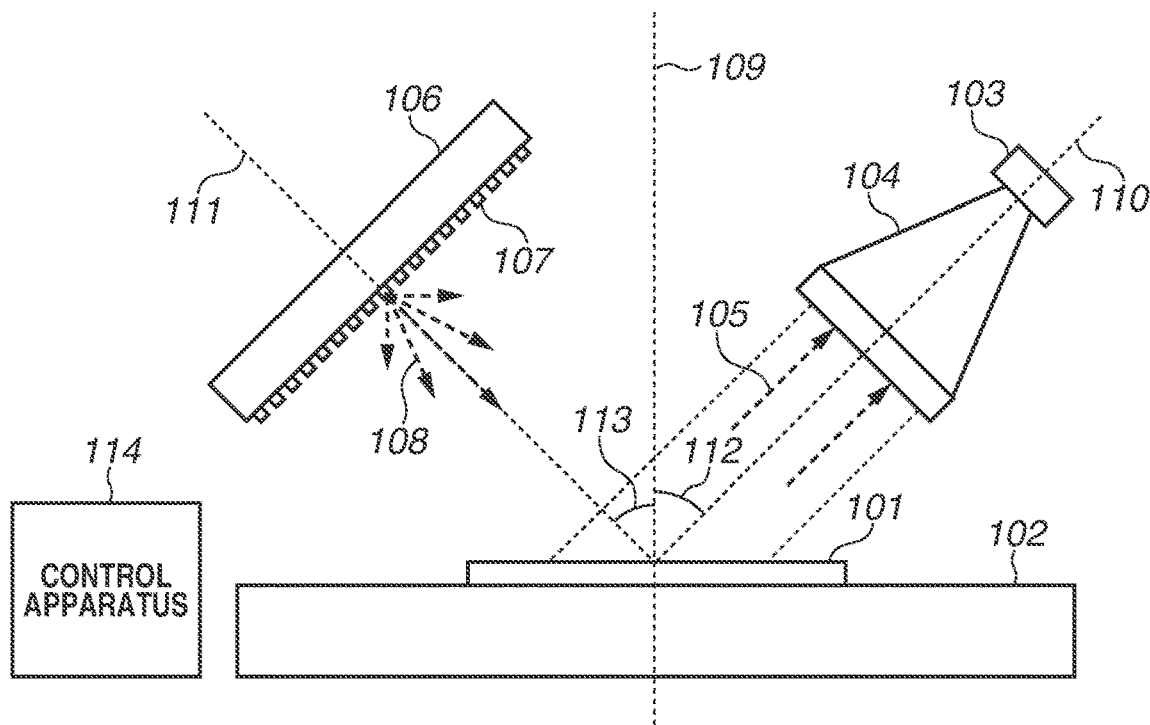
FIGS. 1A and 1B are schematic views illustrating a configuration of a reflection characteristic acquisition system.
Figure 1B:
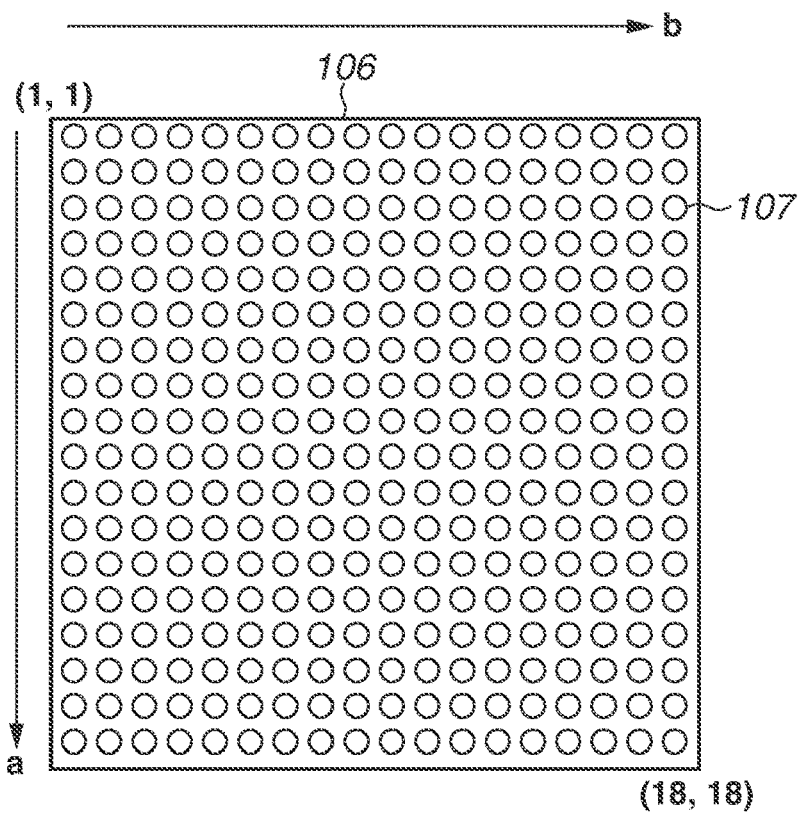

According to a first exemplary embodiment, a plurality of light sources is simultaneously turned on to irradiate an object with light, and the reflection characteristic of the object is derived based on an image obtained by capturing the object. FIGS. 1A and 1B are schematic views illustrating a configuration of a reflection characteristic acquisition system according to the present exemplary embodiment. FIG. 1A is a schematic view illustrating the overall reflection characteristic acquisition system, and FIG. 1B is a schematic view illustrating an illumination device 106 included in the reflection characteristic acquisition system.

An object 101 is the target object to be measured. A fixing jig 102 fixes the object 101. An image capturing device 103 captures the object 101. For example, a monochrome camera including an area sensor of 4096×3000 pixels and capable of obtaining a linear signal value with regard to the luminance of the object 101 as a 16-bit pixel value may be used as the image capturing device 103. It is assumed that the image capturing device 103 has a trigger image capturing function to capture an image in response to an input trigger signal. Image capturing by synchronizing the illumination device 106 described below with the image capturing device 103 may further reduce the time required for image capturing.

A lens 104 is attached to the image capturing device 103 while in use. A telecentric lens is used as the lens 104 to provide a telecentric optical system as an optical system on the side of the image capturing device 103 in the reflection characteristic acquisition system. A telecentric optical system is an optical system having a telecentric structure in which the optical axis of the lens is parallel to the chief ray on the light incident side. As the optical system on the side of the image capturing device 103 is a telecentric optical system, the image capturing device 103 may receive only the light, indicated by an arrow 105, parallel to the optical axis of the lens 104 from among the reflected light from the object 101. As the object 101 is tilted with respect to the optical axis of the lens 104, a telecentric lens having a tilt mechanism may be used as the lens 104.

The illumination device 106 irradiates the object 101 with light from a plurality of directions. Light sources 107 are provided on a surface of the illumination device 106. According to the present exemplary embodiment, it is assumed that the 18×18 light sources 107 are provided on a two-dimensional plane. The smaller the interval between the light sources 107 provided, the higher the angular resolution in the reflection characteristic that may be acquired. The larger the range in which the light sources 107 are provided, the wider the angular range in the reflection characteristic that may be acquired. For example, a light emitting diode (LED) may be used as the light source 107. LEDs typically have directional characteristics such that the luminance varies depending on a direction, as indicated by arrows 108. According to the present exemplary embodiment, an LED having the directional characteristics with a half-value angle of 60° is used. The position of each of the light sources 107 is defined by a position "a" in the row direction and a position "b" in the column direction. The position "a" and the position "b" have an integer value from 1 to 18. For example, the position of the upper-left light source 107 is (a, b)=(1, 1) and the position of the lower-right light source 107 is (a, b)=(18, 18).

Next, the positions and the postures of the object 101, the image capturing device 103, and the illumination device 106 will be described. An axis 109 is perpendicular to the object 101 and passes through the center of the object 101. An optical axis 110 is the optical axis of the image capturing device 103. An axis 111 is perpendicular to the illumination device 106 and passes through the center of the illumination device 106. The axis 109, the optical axis 110, and the axis 111 are on the identical plane, and the positions and the postures of the image capturing device 103 and the illumination device 106 are set such that an angle 112 formed between the axis 109 and the optical axis 110 is identical to an angle 113 formed between the axis 109 and the axis 111. According to the present exemplary embodiment, both the angle 112 and the angle 113 are set to 45°; however, the angle 112 and the angle 113 may be 30° or 60° as long as both the angle 112 and the angle 113 are the same.

Figure 2:
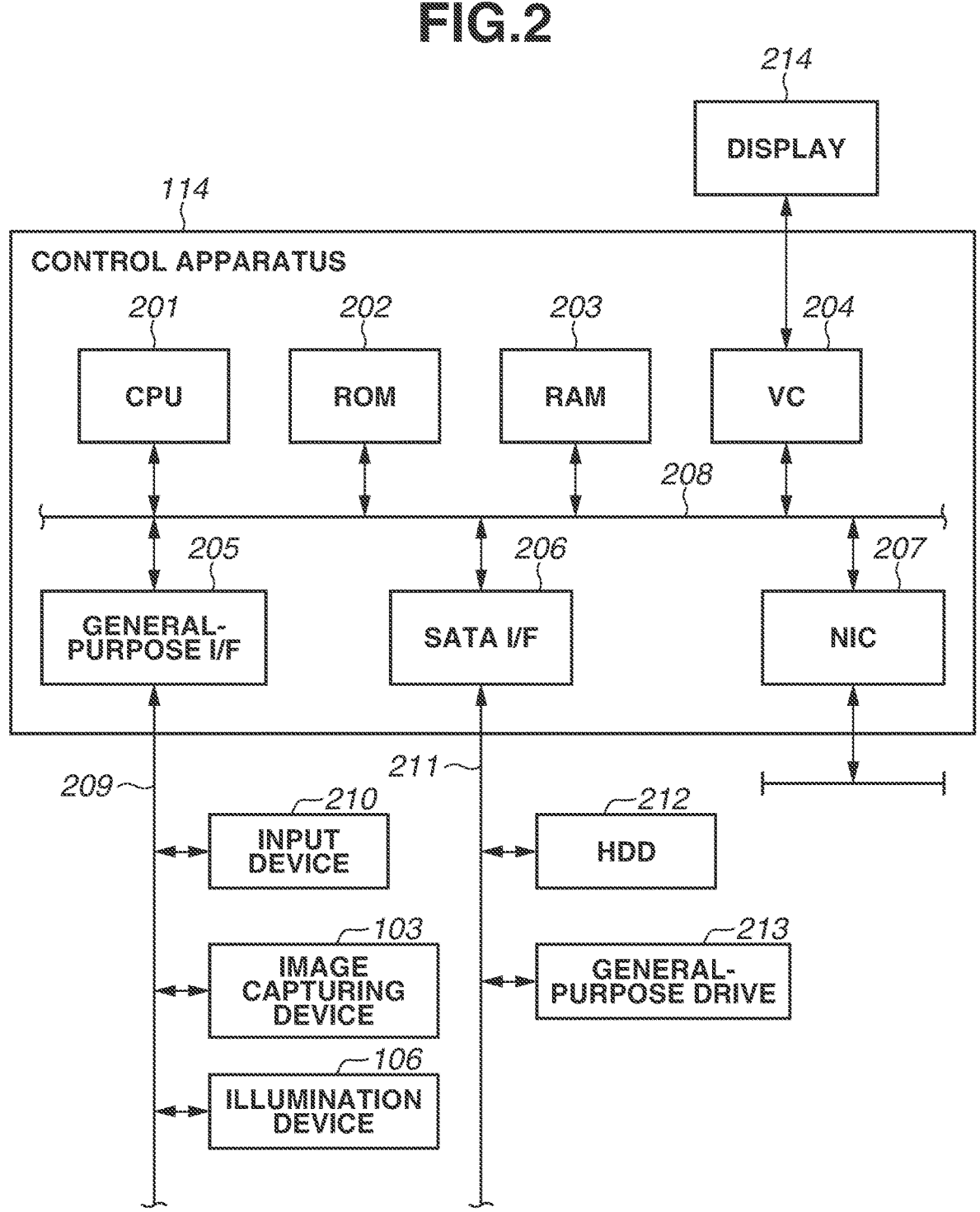
FIG. 2 is a block diagram illustrating a hardware configuration of a control apparatus.

A control apparatus 114 controls the image capturing device 103 and the illumination device 106 to perform a series of processes for acquiring a captured image of the object 101. FIG. 2 is a block diagram illustrating a hardware configuration of the control apparatus 114. The control apparatus 114 includes a central processing unit (CPU) 201, a read only memory (ROM) 202, and a random access memory (RAM) 203. The control apparatus 114 further includes a video card (VC) 204, a general-purpose interface (I/F) 205, a Serial Advanced Technology Attachment (SATA) I/F 206, and a network interface card (NIC) 207. The CPU 201 uses the RAM 203 as a work memory to execute an operating system (OS) and various programs stored in the ROM 202, a hard disk drive (HDD) 212, etc. The CPU 201 controls each component via a system bus 208. The process in a flowchart described below is executed by the CPU 201 after a program code stored in the ROM 202, the HDD 212, etc., is loaded into the RAM 203. The VC 204 is connected to a display 214. The general-purpose I/F 205 is connected to an input device 210, such as a mouse and a keyboard, the image capturing device 103, and the illumination device 106 via a serial bus 209. The SATA I/F 206 is connected to the HDD 212 and a general-purpose drive 213 that executes reading and writing from and to various recording media via a serial bus 211. The NIC 207 inputs and outputs information to and from an external device. The CPU 201 uses the HDD 212 or various recording media mounted on the general-purpose drive 213 as a storage location for various types of data. The CPU 201 causes the display 214 to present a graphical user interface (GUI) provided by a program to receive the input of a user's instruction, or the like, received via the input device 210.

<Functional Configuration of the Control Apparatus>

Figure 3:
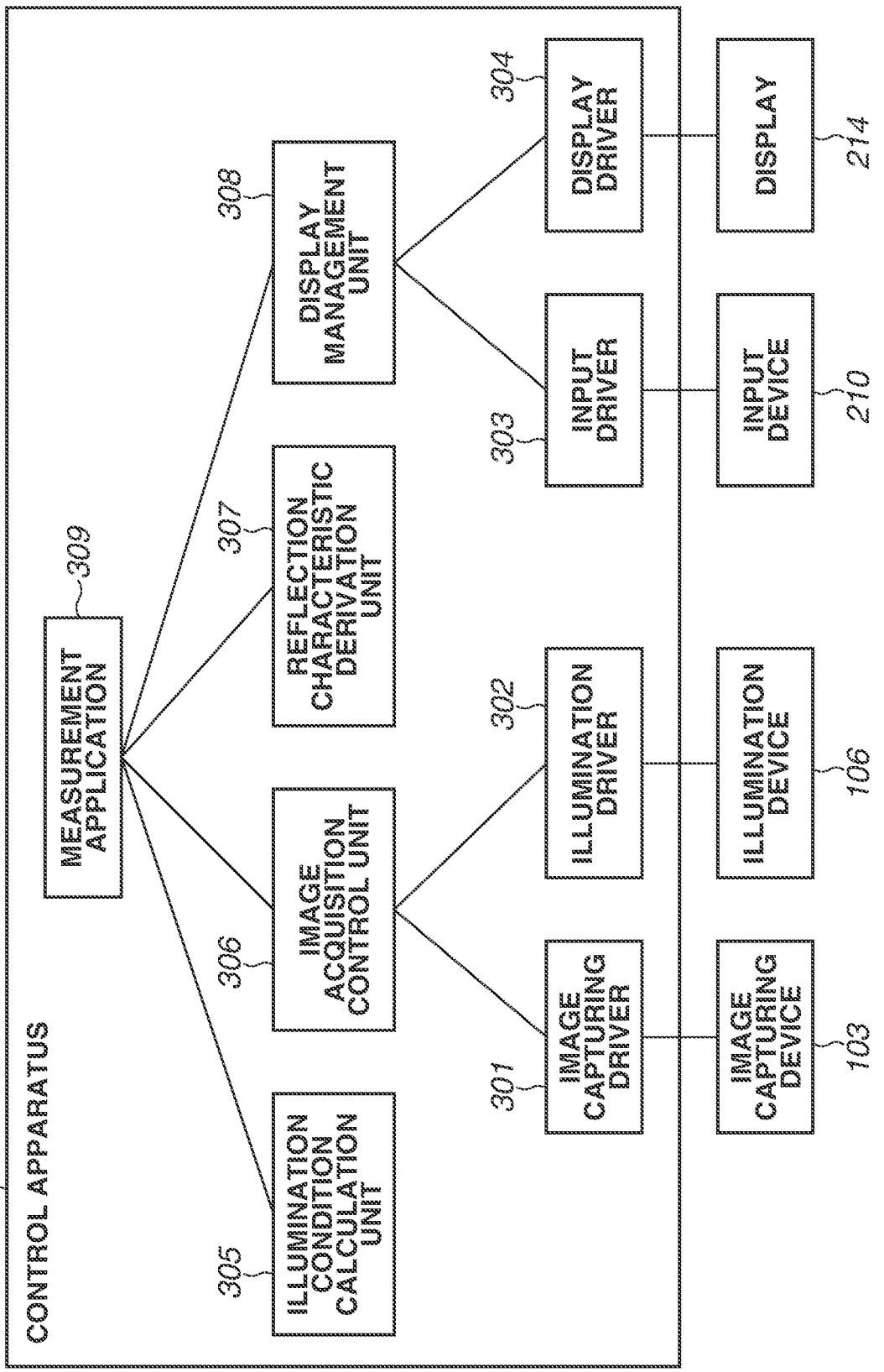
FIG. 3 is a block diagram illustrating a functional configuration of the control apparatus.

FIG. 3 is a block diagram illustrating a functional configuration of the control apparatus 114. An image capturing driver 301 is a set of instructions to control the image capturing device 103. An illumination driver 302 is a set of instructions to control the illumination device 106 and includes instructions for individually turning on or off the plurality of light sources 107. An input driver 303 is a set of instructions to control the input device 210, and a display driver 304 is a set of instructions to control the display 214. An illumination condition calculation unit 305 is a set of instructions to calculate an illumination condition used by an image acquisition control unit 306. The image acquisition control unit 306 is a set of instructions to send an instruction to the image capturing driver 301 and the illumination driver 302 and perform a series of processes so as to acquire captured image data. A reflection characteristic derivation unit 307 is a set of instructions to derive reflection characteristic information on the target object based on the captured image data acquired by the image acquisition control unit 306. A display management unit 308 is a set of instructions to perform a process such as managing information input by a user via the input device 210 or presenting a measurement result on the display 214. A measurement application 309 is a set of instructions to cause the set of instructions of the image capturing driver 301, the illumination driver 302, the input driver 303, the display driver 304, the illumination condition calculation unit 305, the image acquisition control unit 306, the reflection characteristic derivation unit 307, and the display management unit 308 to cooperate so as to function as one measurement application.

<Process of the Measurement Application>

Figure 4:
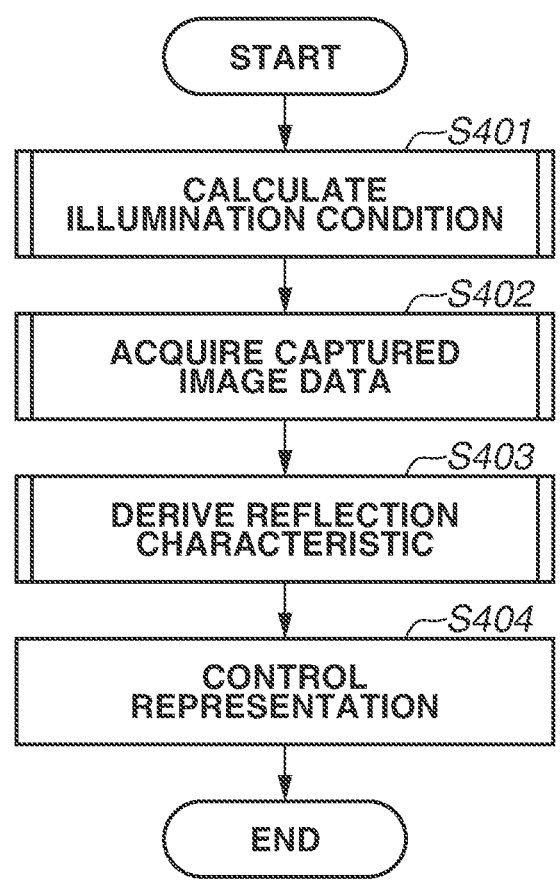
FIG. 4 is a flowchart illustrating a process of a measurement application.

FIG. 4 is a flowchart illustrating a process of the measurement application 309. The process represented by the flowchart in FIG. 4 is started when the user inputs an instruction via the input device 210 and the CPU 201 receives the input instruction. Each step (process) is represented by a code with S attached to the front thereof.

In step S401, the illumination condition calculation unit 305 calculates an illumination condition for irradiating the target object with light. The details of the process to calculate the illumination condition will be described below. In step S402, the image acquisition control unit 306 controls the irradiation of light by the illumination device 106 and the image capturing by the image capturing device 103 based on the calculated illumination condition to acquire captured image data. The details of the process to acquire the captured image data will be described below. In step S403, the reflection characteristic derivation unit 307 processes the captured image data acquired in step S402 to derive a reflection characteristic of the target object. The details of the process to derive the reflection characteristic of the target object will be described below. In step S404, the display management unit 308 causes the display 214 to present the representation corresponding to the derived reflection characteristic of the target object and ends the process.

<Process to Calculate the Illumination Condition>

Figure 5:
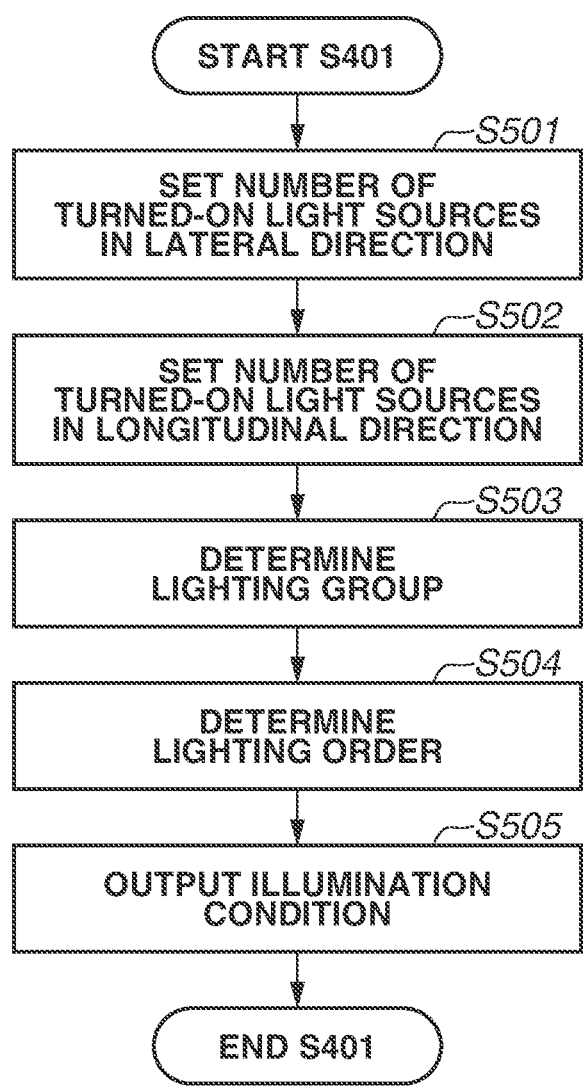
FIG. 5 is a flowchart illustrating a process to calculate an illumination condition.
Figure 7:
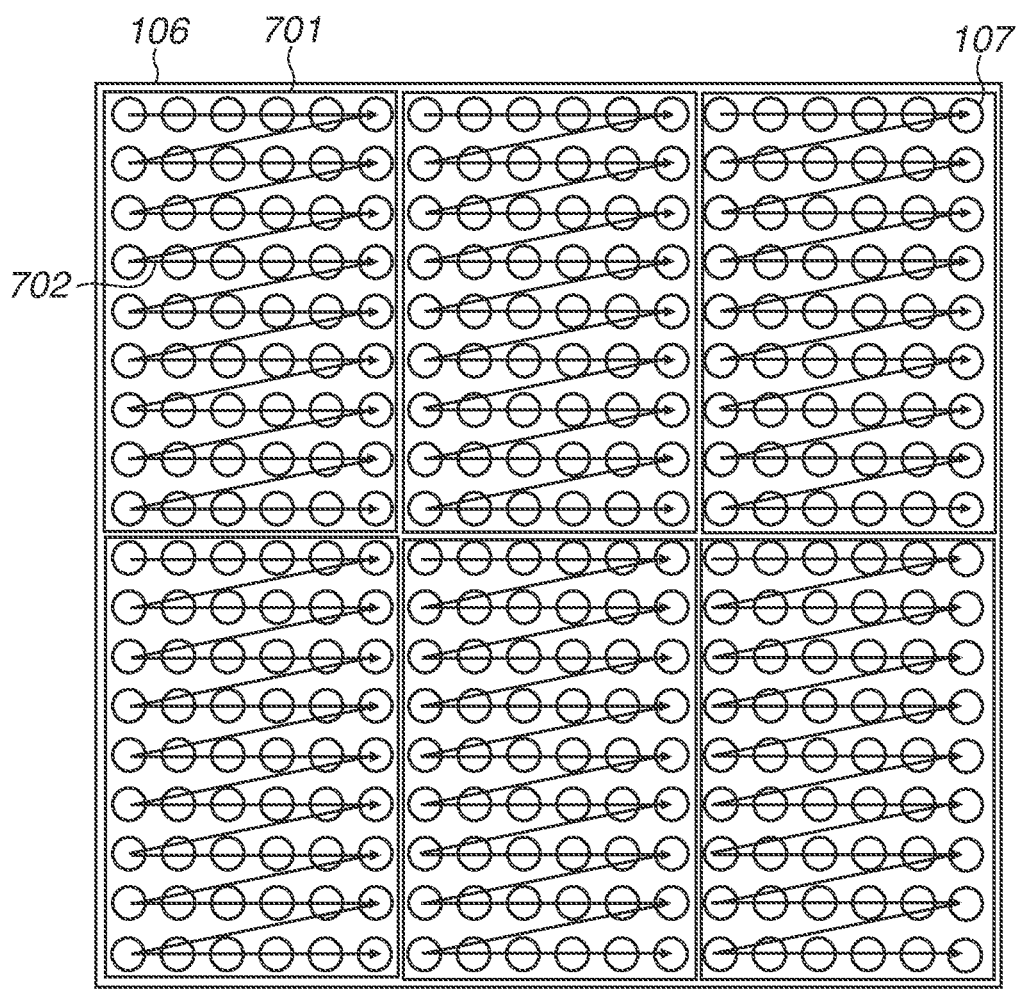
FIG. 7 is a schematic view illustrating an example of a lighting order of light sources.

FIG. 5 is a flowchart illustrating the process to calculate the illumination condition. FIG. 6 is a table illustrating an example of the calculated illumination condition. FIG. 7 is a schematic view illustrating an example of the lighting order of the light sources 107. The details of the process to calculate the illumination condition will be described below with reference to FIGS. 5 to 7. In the description, it is assumed that the number of the light sources 107 in the lateral direction of the illumination device 106 is 18 and the number of the light sources 107 in the longitudinal direction is 18.

In step S501, the illumination condition calculation unit 305 sets the number of the simultaneously turned-on light sources 107 in the lateral direction in accordance with an instruction from the user. The illumination condition calculation unit 305 according to the present exemplary embodiment sets the number of the simultaneously turned-on light sources 107 in the lateral direction to three. In step S502, the illumination condition calculation unit 305 sets the number of the simultaneously turned-on light sources 107 in the longitudinal direction in accordance with an instruction from the user. The illumination condition calculation unit 305 according to the present exemplary embodiment sets the number of the simultaneously turned-on light sources 107 in the longitudinal direction to two. In step S503, the illumination condition calculation unit 305 divides the surface where the plurality of light sources 107 are provided into a plurality of regions based on the set number of the simultaneously turned-on light sources 107 in the lateral direction and the set number of the simultaneously turned-on light sources 107 in the longitudinal direction to determine lighting groups. The illumination condition calculation unit 305 according to the present exemplary embodiment divides the surface in the lateral direction in three and divides the surface in the longitudinal direction in two. Thus, six lighting groups are created as represented by a region 701 in FIG. 7, in each of which the number of the light sources 107 in the lateral direction is six and the number of the light sources 107 in the longitudinal direction is nine. In step S504, the illumination condition calculation unit 305 determines the lighting order of the light sources 107. The lighting order is indicated by an arrow 702 in FIG. 7. Specifically, the illumination device 106 sequentially turns on the light sources 107 in the order indicated by the arrow 702, starting from the upper-left light source 107 in each lighting group. In step S505, the illumination condition calculation unit 305 outputs the illumination conditions in the data format illustrated in FIG. 6. The illumination conditions include the image capturing order and the position of the light source 107 to be turned on in each lighting group. By calculating the illumination conditions in this way, it is possible to provide an interval between the light sources 107 that are simultaneously turned on. Even in a case where the plurality of light sources 107 are simultaneously turned on, the distance between the simultaneously turned-on light sources 107 greater than a predetermined threshold value makes it possible to receive, in each incident direction, the light having a light amount similar to the light amount obtained when one of the light sources 107 is turned on. In a case where the distance between the simultaneously turned-on light sources 107 is equal to or less than the predetermined threshold value, error notification may be made.

<Process to Acquire the Captured Image Data>

Figure 8:
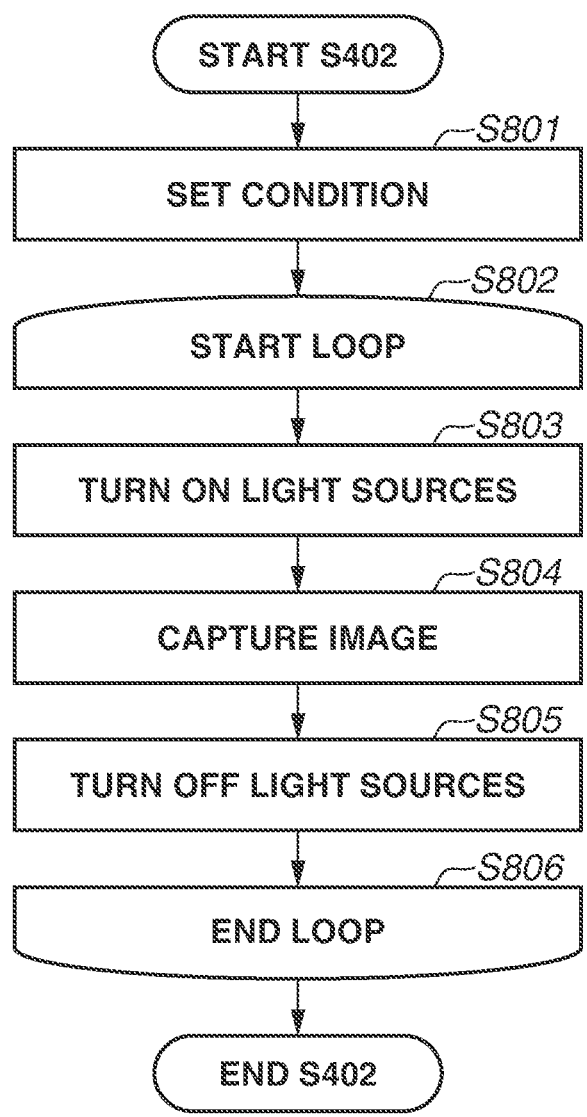
FIG. 8 is a flowchart illustrating a process to acquire captured image data.

FIG. 8 is a flowchart illustrating the process to acquire the captured image data. The details of the process to acquire the captured image data will be described below with reference to FIG. 8. It is assumed that the target object is fixed to the fixing jig 102.

In step S801, the image acquisition control unit 306 sets a condition for image capturing. The conditions set here are the shutter speed, ISO sensitivity, etc., of the image capturing device 103. The illumination condition derived in step S401 is set as an illumination condition of the illumination device 106. The shutter speed, ISO sensitivity, and the like, are set based on the information obtained via a user interface (UI) provided by the display management unit 308. Step S802 is a step to start the loop process from step S803 to step S805. The process from step S803 to step S805 is performed each time the light sources 107 are simultaneously turned on. In step S803, the image acquisition control unit 306 causes the illumination device 106 to simultaneously turn on the plurality of light sources 107 that are designated based on the illumination condition. In step S804, the image acquisition control unit 306 sends, to the image capturing device 103, a synchronization signal for capturing an image in synchronization with the simultaneous turn-on of the light sources 107, and the image capturing device 103 is triggered by the synchronization signal to capture an image in accordance with an image capturing condition. In step S805, the image acquisition control unit 306 causes the illumination device 106 to turn off the light sources 107 that are designated based on the illumination condition. Subsequently, the image acquisition control unit 306 changes the positions of the simultaneously turned-on light sources 107, and the processing returns to step S803 to perform the process from step S803 to step S805. When the image acquisition control unit 306 has performed the lighting and the image capturing for all the light sources 107 during the process from step S803 to step S805, the processing proceeds to step S806 to end the loop process from step S803 to step S805.

Thus, the image acquisition control unit 306 according to the present exemplary embodiment executes image capturing each time the positions of the simultaneously turned-on light sources 107 are changed, and acquires the captured image data on the target object for each of the positions of the simultaneously turned-on light sources 107. As the number of the simultaneously turned-on light sources 107 according to the present exemplary embodiment is six, image capturing is executed 54 times in total. In a case where image capturing is executed without the simultaneous turn-on, image capturing is to be executed 324 times. According to the present exemplary embodiment, the image capturing with the simultaneously turned-on light sources 107 may reduce the image capturing time.

<Process to Derive the Reflection Characteristic of the Target Object>

Figure 9:
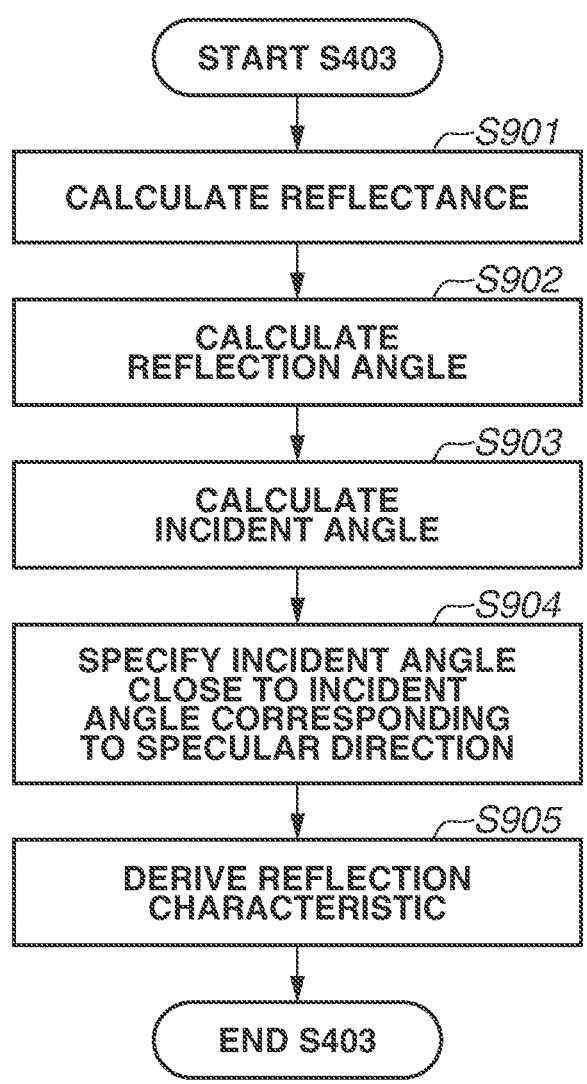
FIG. 9 is a flowchart illustrating a process to derive a reflection characteristic of a target object.

FIG. 9 is a flowchart illustrating the process to derive the reflection characteristic of the target object. The details of the process to derive the reflection characteristic of the target object will be described below with reference to FIG. 9.

In step S901, the reflection characteristic derivation unit 307 reads a pixel value $OBJ_{i,u,v}$ in the captured image of the target object during each simultaneous turn-on of the light sources 107 and a pixel value $REF_{i,u,v}$ in the captured image of a white plate during each simultaneous turn-on of the light sources 107. The reflection characteristic derivation unit 307 calculates reflectance $R_{i,u,v}$ using Equation (1).

$$R_{i,u,v} = OBJ_{i,u,v}/REF_{i,u,v} \quad (1)$$

Here, a label i specifies the captured image. According to the present exemplary embodiment, the label i has an integer value from 1 to 54. An index u represents a pixel position in the lateral direction of the captured image, and an index v represents a pixel position in the longitudinal direction of the captured image. According to the present exemplary embodiment, the index u has an integer value from 1 to 4096, and the index v has an integer value from 1 to 3000.

In step S902, the reflection characteristic derivation unit 307 calculates a reflection angle $(\theta_{R(i,u,v)}, \varphi_{R(i,u,v)})$. Here, $\theta_{R(i,u,v)}$ is the zenith angle of the reflection angle, and $\varphi_{R(i,u,v)}$ is the azimuth angle of the reflection angle. As image capturing is performed by using a telecentric lens, the zenith angle and the azimuth angle of the reflection angle have certain values regardless of the captured image (i) or the pixel position (u, v). According to the present exemplary embodiment, the zenith angle and the azimuth angle of the reflection angle have the values represented by Equations (2) and (3) since the angle 112 is set to 45° for image capturing.

$$\theta_{R(i,u,v)} = 45 \quad (2)$$

$$\varphi_{R(i,u,v)} = 0 \quad (3)$$

In step S903, the reflection characteristic derivation unit 307 calculates an incident angle ($\theta_{I(i,j,u,v)}$, $\varphi_{I(i,j,u,v)}$). Here, $\theta_{I(i,j,u,v)}$ is the zenith angle of the incident angle, and $\varphi_{I(i,j,u,v)}$ is the azimuth angle of the incident angle. According to the present exemplary embodiment, image capturing is executed by simultaneously turning on the plurality of light sources 107 and the incident angle is calculated for each of the simultaneously turned-on light sources 107. Here, a label j specifies the light source 107. For example, in a case where the number of the simultaneously turned-on light sources 107 is 2, the label j is 1 or 2. The incident angle is calculated by using real-space positional information ($x_{u,v}$, $y_{u,v}$, $z_{u,v}$) corresponding to the pixel position (u, v) and real-space positional information ($x_{L(i,j)}$, $y_{L(i,j)}$, $z_{L(i,j)}$) on each of the light sources 107 corresponding to each captured image. The incident angle is calculated according to Equations (4), (5), (6), (7), and (8).

$$L_{i,j,u,v,1} = x_{L(i,j)} - x_{u,v} \quad (4)$$

$$L_{i,j,u,v,2} = y_{L(i,j)} - y_{u,v} \quad (5)$$

$$L_{i,j,u,v,3} = z_{L(i,j)} - z_{u,v} \quad (6)$$

$$\theta_{I(i,j,u,v)} = \mathrm{acos}\left(L_{i,j,u,v,3} * \sqrt{(L_{i,j,u,v,1})^2 + (L_{i,j,u,v,2})^2 + (L_{i,j,u,v,3})^2}\right) \quad (7)$$

$$\phi_{I(i,j,u,v)} = \mathrm{sign}(L_{i,j,u,v,2}) * \mathrm{acos}\left(L_{i,j,u,v,1} / \sqrt{(L_{i,j,u,v,1})^2 + (L_{i,j,u,v,2})^2}\right) \quad (8)$$

Predetermined values are used for the positional information ($x_{u,v}$, $y_{u,v}$, $z_{u,v}$) and the positional information ($x_{L(u,v)}$, $y_{L(u,v)}$, $z_{L(u,v)}$).

In step S904, the reflection characteristic derivation unit 307 specifies, from among the incident angles calculated in step S903, an incident angle ($\theta'_{I(i,u,v)}$, $\varphi'_{I(i,u,v)}$) close to the incident angle corresponding to the specular direction. Here, the specular direction is a direction in which the image capturing device 103 receives a specular reflected light that is reflected by the target object. Furthermore, $\theta'_{I(i,u,v)}$ is the zenith angle of the incident angle used in step S905, and $\varphi'_{I(i,u,v)}$ is the azimuth angle of the incident angle used in step S905. Specifically, by using Equation (9), a difference $\Delta_{i,j,u,v}$ between the incident angle calculated in step S903 and the incident angle corresponding to the specular direction is calculated based on the assumption that the reflection angle calculated in step S902 is the incident angle corresponding to the specular direction. Moreover, the label j having the minimum difference $\Delta_{i,j,u,v}$ is specified, and the incident angle corresponding to the specified label j is set as the incident angle to be used in step S905.

$$\Delta_{i,j,u,v} = \sqrt{(\theta_{I(i,j,u,v)} - \theta_{R(i,u,v)})^2 + (\phi_{I(i,j,u,v)} - \phi_{R(i,u,v)})^2} \quad (9)$$

Figure 10:
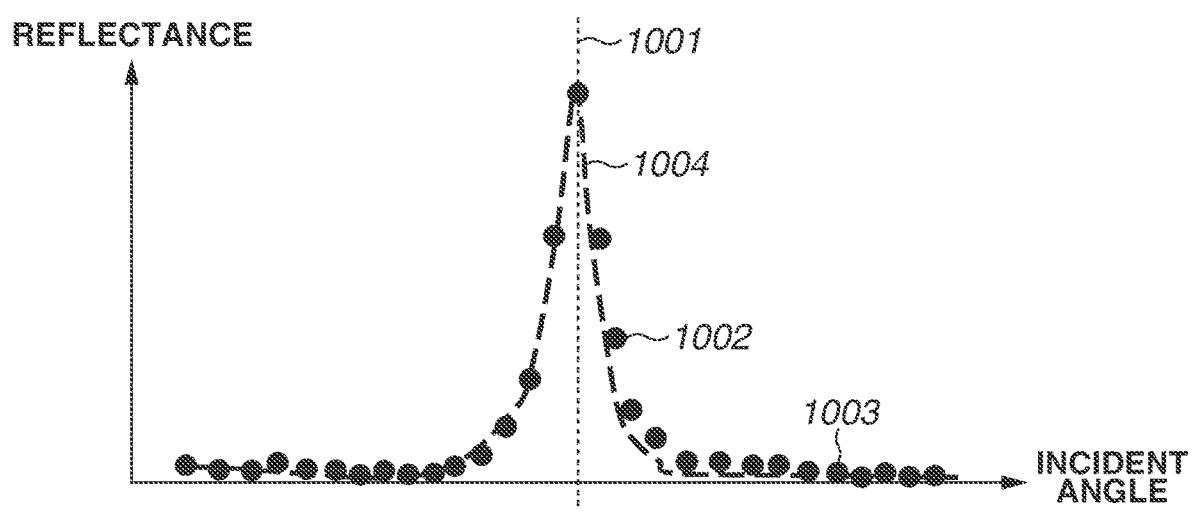
FIG. 10 is a graph illustrating a reflection characteristic at a certain point of the target object.

The reason why the incident angle close to the incident angle corresponding to the specular direction is specified will now be described. FIG. 10 is a graph illustrating the reflection characteristic at a certain point of the target object. In the graph of FIG. 10, the horizontal axis represents an incident angle, and the vertical axis indicates reflectance. An incident angle 1001 is the incident angle corresponding to the specular direction. A measured value 1002 is a value obtained at the incident angle closer to the incident angle corresponding to the specular direction than the incident angle corresponding to a measured value 1003 is. A reflection model 1004 is a reflection model that is approximated to the measured values. As illustrated in FIG. 10, in the typical object reflection characteristics, the reflectance reaches a peak at the incident angle corresponding to the specular direction, and the reflectance largely changes near the incident angle corresponding to the specular direction. Reflectance is higher at the measured value 1002 obtained at the incident angle closer to the incident angle corresponding to the specular direction than at the measured value 1003.

For example, when it is assumed that the reflectances corresponding to the respective two simultaneously turned-on light sources 107 are the measured value 1002 and the measured value 1003, respectively, the reflectance measured at a certain pixel is the sum of the measured value 1002 and the measured value 1003. That is, the measured value impacted by the light from the plurality of light sources 107 is obtained at one pixel. Therefore, according to the present exemplary embodiment, the impact of the measured value 1003 having lower reflectance is disregarded so that, even when image capturing is executed by simultaneously turning on the light sources 107, the reflection characteristic may be derived based on the information close to the information obtained when one of the light sources 107 is turned on.

In step S905, the reflection characteristic derivation unit 307 reads the reflectance $R_{i,u,v}$, the reflection angle ($\theta_{R(i,u,v)}$, $\varphi_{R(i,u,v)}$), the incident angle specified in step S904, and the positional information ($x_{u,v}$, $y_{u,v}$, $z_{u,v}$). The reflection characteristic derivation unit 307 uses the read information and the reflection model to derive the two-dimensional distribution of parameters of the reflection model as the reflection characteristic of the target object. A known reflection model, such as the Torrance-Sparrow model, may be used as the reflection model.

Effect of the First Exemplary Embodiment

As described above, the control apparatus 114 according to the present exemplary embodiment controls the illumination device 106 including the plurality of light sources 107. The control apparatus 114 controls the illumination device 106 such that two or more of the plurality of light sources 107 are turned on when the object 101 is captured. The reflection characteristic of the object 101 is derived based on the image data obtained by capturing the object 101. When the illumination device 106 is controlled, the two or more light sources 107 are turned on such that the distance between the two or more light sources 107 is greater than a predetermined threshold value. This allows a reduction in the time required for the image capturing performed to acquire the reflection characteristic of the object 101. Furthermore, the information close to the information obtained when one of the light sources 107 is turned on may be acquired in each incident direction of light, and the reflection characteristic may be derived based on the acquired information.

<Modification>

In step S401, instead of calculating the illumination condition by the illumination condition calculation unit 305, the image acquisition control unit 306 may acquire the information about the illumination condition previously stored in the HDD 212, or the like, and control the light irradiation and the image capturing.

In step S404, instead of presenting the display corresponding to the reflection characteristic of the target object by the display management unit 308, the reflection characteristic derivation unit 307 may directly record the derived parameter in the HDD 212, etc.

In step S402, in order to reduce uneven illuminance for the target object, the image acquisition control unit 306 may capture an image of a white diffuse reflection plate in the same manner as an image of the target object and correct uneven illuminance.

In step S905, the reflection characteristic derivation unit 307 may use a reflection model that takes into account the impact by the plurality of light sources 107 to derive the reflection characteristic of the target object. For example, the reflection characteristic derivation unit 307 may use Equations (10) and (11) below to derive a reflection characteristic R of the target object, where $R_{surf}$ is a known surface reflection model, such as the Cook-Torrance model, $R_{diffuse}$ is a known diffuse reflection model, such as the Lambert model, and N is the number of the simultaneously turned-on light sources 107.

$$R = R_{surf} + R_{diffuse} + R_{other} \quad (10)$$

$$R_{other} = (N-1) * R_{diffuse} \quad (11)$$

A second exemplary embodiment will be described. According to the first exemplary embodiment, the reflection characteristic of the target object is derived based on the captured image obtained during image capturing with the simultaneously turned-on light sources 107. In a case where the target is an object having low gloss image clarity, however, the impact of the reflectance corresponding to a reflection angle remote from the specular direction is considerable as a result of an increase in the number of the simultaneously turned-on light sources 107. That is, the number of the simultaneously turned-on light sources 107 to be set varies depending on the gloss image clarity of the target object. According to the present exemplary embodiment, pre-image capturing is executed on the target object, and the gloss image clarity of the target object is estimated based on the image obtained during the pre-image capturing. The optimal illumination condition is calculated based on the estimated gloss image clarity of the target object. As the hardware configuration and the functional configuration of the control apparatus 114 according to the present exemplary embodiment are equivalent to the hardware configuration and the functional configuration according to the first exemplary embodiment, the description thereof is omitted. The parts that are different between the present exemplary embodiment and the first exemplary embodiment will be mainly described below. The configuration identical to the configuration according to the first exemplary embodiment will be denoted by the identical reference number in the description.

<Process to Calculate the Illumination Condition>

FIG. 11 is a flowchart illustrating the process to calculate the illumination condition. The details of the process to calculate the illumination condition will be described below with reference to FIG. 11. In step S1101, the image acquisition control unit 306 turns on one of the light sources 107 of the illumination device 106 and captures images of the target object and the white diffuse reflection plate by using the image capturing device 103. The light source 107 to be turned on may be the light source 107 at a predetermined position or the light source 107 at a position determined based on a user's instruction.

In step S1102, the illumination condition calculation unit 305 estimates the gloss image clarity of the target object based on the captured images of the target object and the white plate based on the assumption that the gloss image clarity of the target object is even regardless of the position. Specifically, first, the illumination condition calculation unit 305 reads a pixel value $OBJ_{u,v}$ in the captured image of the target object and a pixel value $REF_{u,v}$ in the captured image of the white plate and calculates reflectance $R_{u,v}$ using Equation (12).

$$R_{u,v} = OBJ_{u,v} / REF_{u,v} \quad (12)$$

Here, the index u represents a pixel position in the lateral direction of the captured image, and the index v represents a pixel position in the longitudinal direction of the image.

Subsequently, the illumination condition calculation unit 305 calculates a reflection angle $(\theta_{R(u,v)}, \varphi_{R(u,v)})$. Here, $\theta_{R(u,v)}$ is the zenith angle of the reflection angle, and $\varphi_{R(u,v)}$ is the azimuth angle of the reflection angle. Since the image capturing is executed by using a telecentric lens with the angle 112 set to 45°, the zenith angle and the azimuth angle of the reflection angle have the values represented by Equations (13) and (14).

$$\theta_{R(u,v)} = 45 \quad (13)$$

$$\varphi_{R(u,v)} = 0 \quad (14)$$

Next, the illumination condition calculation unit 305 calculates an incident angle $(\theta_{I(u,v)}, \varphi_{I(u,v)})$. Here, $\theta_{I(u,v)}$ is the zenith angle of the incident angle, and $\varphi_{I(u,v)}$ is the azimuth angle of the incident angle. The incident angle is calculated by using the real-space positional information $(x_{u,v}, y_{u,v}, z_{u,v})$ corresponding to the pixel position (u, v) and the real-space positional information $(x_L, y_L, z_L)$ on each of the light sources 107 corresponding to each captured image. The incident angle is calculated according to Equations (15), (16), (17), (18), and (19).

$$L_{u,v,1} = x_L - x_{u,v} \quad (15)$$

$$L_{u,v,2} = y_L - y_{u,v} \quad (16)$$

$$L_{u,v,3} = z_L - z_{u,v} \quad (17)$$

$$\theta_{I(u,v)} a \cos(L_{u,v,3} * \sqrt{(L_{u,v,1})^2 + (L_{u,v,2})^2 + (L_{u,v,3})^2}) \quad (18)$$

$$\phi_{I(u,v)} = Sig\ n(L_{u,v,2}) * a \cos(L_{u,v,1} / \sqrt{(L_{u,v,1})^2 + (L_{u,v,2})^2}) \quad (19)$$

Next, the illumination condition calculation unit 305 reads the reflectance $R_{u,v}$, the reflection angle $(\theta_{R(u,v)}, \varphi_{R(u,v)})$, the incident angle $(\theta_{I(u,v)}, \varphi_{I(u,v)})$, and the positional information $(x_{u,v}, y_{u,v}, z_{u,v})$. The illumination condition calculation unit 305 estimates the gloss image clarity of the target object by using the read information and the reflection model and outputs the parameter representing the gloss image clarity. Here, a known reflection model such as a Gaussian function model may be used as the reflection model. In this case, for example, the difference between the incident angle at which the reflectance value is maximum and the incident angle at which the reflectance value is half of the maximum value is calculated as the value representing the gloss image clarity.

In step S1103, the illumination condition calculation unit 305 calculates the optimal illumination condition based on the estimated gloss image clarity of the target object. First, the illumination condition calculation unit 305 calculates the number of the simultaneously turned-on light sources 107 in the lateral direction based on the gloss image clarity of the target object. Specifically, the illumination condition calculation unit 305 calculates the number of the simultaneously turned-on light sources 107 in the lateral direction based on the real-space positional information corresponding to the center of a captured image, the real-space positional information on each of the light sources 107 corresponding to each captured image, and the value representing the gloss image clarity. Here, the illumination condition calculation unit 305 calculates the number of the simultaneously turned-on light sources 107 in the lateral direction such that the light enters at the incident angle having a difference from the incident angle corresponding to the specular direction so as to sufficiently attenuate the reflectance. For example, the illumination condition calculation unit 305 calculates the number of the simultaneously turned-on light sources 107 in the lateral direction based on the assumption that the reflectance is sufficiently attenuated at about three times the value representing the gloss image clarity. Then, the illumination condition calculation unit 305 calculates the number of the simultaneously turned-on light sources 107 in the longitudinal direction based on the value representing the gloss image clarity in the same way as in the lateral direction. Next, the illumination condition calculation unit 305 determines the lighting groups and the lighting order based on the calculated number of the simultaneously turned-on light sources 107 in the lateral direction and the calculated number of the simultaneously turned-on light sources 107 in the longitudinal direction and outputs the calculated illumination condition.

Effect of the Second Exemplary Embodiment

As described above, the control apparatus 114 according to the present exemplary embodiment estimates the gloss image clarity of the target object based on the image obtained by pre-image capturing and calculates the illumination condition based on the estimated gloss image clarity. This makes it possible to simultaneously turn on the light sources 107 at an interval suitable for the target object and to derive the reflection characteristic of the target object with high accuracy.

According to the above-described exemplary embodiment, the lighting groups and the lighting order are determined based on the number of the simultaneously turned-on light sources 107; however, the lighting patterns specifying the lighting groups and the lighting order may be previously generated, and at least one of the lighting patterns may be selected based on a user's instruction, the gloss image clarity of the object, etc.

According to the present exemplary embodiment of the disclosure, the time required for image capturing performed to acquire the reflection characteristic of the object may be reduced.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-131687, filed Aug. 3, 2020, which is hereby incorporated by reference herein in its entirety.

What is claimed is:

1. An apparatus comprising:
one or more processors; and
at least one memory coupled to the one or more processors storing instructions that, when executed by the one or more processors, cause the one or more processors to function as:
a control unit configured to control an illumination unit such that two or more light sources from among a plurality of light sources of the illumination unit are turned on when an image of an object is captured; and
a derivation unit configured to derive a reflection characteristic of the object based on image data obtained by capturing the image of the object,
wherein the derivation unit specifies one incident angle from among incident angles of light incident on the object from the respective two or more light sources, and derives the reflection characteristic of the object based on the image data and the one specified incident angle.

2. The apparatus according to claim 1, wherein the control unit further controls a capturing unit including a system to capture the image of the object irradiated with light from the two or more light sources.

3. The apparatus according to claim 1, wherein the derivation unit specifies, as the one incident angle, an incident angle closest to an incident angle corresponding to a specular reflected light received by the capturing unit from among the incident angles of the light incident on the object from the respective two or more light sources.

4. The apparatus according to claim 1, wherein the derivation unit derives a parameter of a reflection model as information representing the reflection characteristic of the object.

5. The apparatus according to claim 1, wherein the one or more processors further function as a selection unit configured to select at least one lighting pattern from a plurality of lighting patterns,
wherein the control unit controls the illumination unit based on the selected lighting pattern.

6. The apparatus according to claim 1, wherein the one or more processors further function as a setting unit configured to set an illumination condition with regard to the two or more light sources,
wherein the control unit controls the illumination unit based on the set illumination condition.

7. The apparatus according to claim 6, wherein the setting unit sets the illumination condition based on gloss image clarity of the object.

8. The apparatus according to claim 6, wherein the setting unit sets a number of simultaneously turned-on light sources as the illumination condition.

9. The apparatus according to claim 8, wherein the setting unit determines the light sources to be simultaneously turned on and a lighting order of the light sources based on the number of simultaneously turned-on light sources.

10. The apparatus according to claim 8, wherein the setting unit divides the plurality of light sources into a plurality of groups based on the number of simultaneously turned-on light sources.

11. The apparatus according to claim 10, wherein the control unit turns on the light sources one by one in each of the plurality of groups.

12. A method comprising:
controlling an illumination unit such that two or more light sources from among the plurality of light sources of the illumination unit are turned on when an image of an object is captured;
specifying one incident angle from among incident angles of light incident on the object from the respective two or more light sources; and
deriving a reflection characteristic of the object based on the one specified incident angle and image data obtained by capturing the image of the object.

13. The method according to claim 12, wherein the controlling includes capturing the image of the object irradiated with light from the two or more light sources.

14. The method according to claim 12, further comprising setting an illumination condition with regard to the two or more light sources,
wherein the controlling controls the illumination unit based on the set illumination condition.

15. A non-transitory computer-readable storage medium storing instructions that, when executed by a computer, cause the computer to perform a method, the method comprising:
controlling an illumination unit such that two or more light sources from among the plurality of light sources of the illumination units are turned on when an image of an object is captured;
specifying one incident angle from among incident angles of light incident on the object from the respective two or more light sources; and
deriving a reflection characteristic of the object based on the one specified incident angle and image data obtained by capturing the image of the object.

16. The non-transitory computer-readable storage medium according to claim 15, further comprising specifying one incident angle from among incident angles of light incident on the object from the respective two or more light sources,
wherein the deriving derives a reflection characteristic of the object based on the image data and the one specified incident angle.

17. The non-transitory computer-readable storage medium according to claim 15, wherein the controlling includes capturing the image of the object irradiated with light from the two or more light sources.

18. The non-transitory computer-readable storage medium according to claim 15, further comprising setting an illumination condition with regard to the two or more light sources,
wherein the controlling controls the illumination unit based on the set illumination condition.

* * * * *